(12) United States Patent
Valz

(10) Patent No.: US 7,856,433 B2
(45) Date of Patent: Dec. 21, 2010

(54) DYNAMIC BID PRICING FOR SPONSORED SEARCH

(75) Inventor: Duane R. Valz, Emeryville, CA (US)

(73) Assignee: Yahoo! Inc., Sunnyvale, CA (US)

( * ) Notice: Subject to any disclaimer, the term of this patent is extended or adjusted under 35 U.S.C. 154(b) by 364 days.

(21) Appl. No.: 11/784,481

(22) Filed: Apr. 6, 2007

(65) Prior Publication Data

US 2008/0249991 A1 Oct. 9, 2008

(51) Int. Cl.
*G06F 17/30* (2006.01)
(52) U.S. Cl. .................... 707/722; 707/723; 707/732
(58) Field of Classification Search ............ 707/3–7, 707/722–723, 732, 769; 705/10, 20, 14.4, 705/19

See application file for complete search history.

(56) References Cited

U.S. PATENT DOCUMENTS

| | | | |
|---|---|---|---|
| 5,583,763 A | 12/1996 | Atcheson et al. | |
| 6,006,221 A | 12/1999 | Liddy et al. | |
| 6,009,409 A | 12/1999 | Adler et al. | |
| 6,026,368 A | 2/2000 | Brown et al. | |
| 6,076,088 A | 6/2000 | Paik et al. | |
| 6,102,969 A | 8/2000 | Christianson et al. | |
| 6,269,361 B1 * | 7/2001 | Davis et al. .................... | 707/3 |
| 6,363,373 B1 | 3/2002 | Steinkraus | |
| 6,401,075 B1 | 6/2002 | Mason et al. | |
| 6,539,348 B1 | 3/2003 | Bond et al. | |
| 6,584,464 B1 | 6/2003 | Warthen | |
| 6,675,159 B1 | 1/2004 | Lin et al. | |
| 6,714,975 B1 | 3/2004 | Aggarwal et al. | |
| 6,772,150 B1 | 8/2004 | Whitman et al. | |

(Continued)

FOREIGN PATENT DOCUMENTS

KR 10-2006-0033107 A 4/2006

OTHER PUBLICATIONS

Written Opinion of the International Searching Authority and International Search Report for International Application No. PCT/US2008/056159 dated Aug. 7, 2008 (11 pages).

(Continued)

*Primary Examiner*—Jean B. Fleurantin
*Assistant Examiner*—Thu-Nguyet Le
(74) *Attorney, Agent, or Firm*—Brinks Hofer Gilson & Lione

(57) ABSTRACT

A method for an online sponsored search system includes storing a database of items. At least some of the items include a keyword and a money amount associated with a respective advertiser. The method further includes receiving information about current user preferences within the online sponsored search system. When the received user information relates to a keyword of an item, the method includes automatically adjusting the money amount of the item based on the received user interest information. In response to a received user query, the method includes identifying items relating to the received user search query and generating a search result list including the related items. The method then includes ordering the related items according to the adjusted money amounts associated with the matching items. In response to the designation of a Web page to receive sponsored advertisements, the method includes identifying items relating to the subject matter of one or more portions of the Web page. In this instance, the method then includes determining which items are to be shown and their placement on the Web page according to the adjusted money amounts associated with the related items.

14 Claims, 4 Drawing Sheets

U.S. PATENT DOCUMENTS

| | | | |
|---|---|---|---|
| 6,826,572 | B2 | 11/2004 | Colace et al. |
| 6,907,566 | B1 | 6/2005 | McElfresh et al. |
| 7,043,483 | B2 | 5/2006 | Colace et al. |
| 7,051,023 | B2 | 5/2006 | Kapur et al. |
| 7,146,416 | B1 | 12/2006 | Yoo et al. |
| 2002/0169760 | A1* | 11/2002 | Cheung et al. .......... 707/3 |
| 2003/0046161 | A1 | 3/2003 | Kamangar et al. |
| 2003/0055816 | A1 | 3/2003 | Paine et al. |
| 2003/0149938 | A1 | 8/2003 | McElfresh et al. |
| 2004/0093327 | A1 | 5/2004 | Anderson et al. |
| 2004/0107137 | A1 | 6/2004 | Skinner |
| 2004/0186776 | A1 | 9/2004 | Llach |
| 2005/0010477 | A1 | 1/2005 | Sullivan et al. |
| 2005/0154746 | A1 | 7/2005 | Liu et al. |
| 2005/0234953 | A1 | 10/2005 | Zhang et al. |
| 2006/0026063 | A1 | 2/2006 | Collins |
| 2006/0074749 | A1 | 4/2006 | Kline et al. |
| 2006/0156222 | A1 | 7/2006 | Chi et al. |
| 2006/0190385 | A1 | 8/2006 | Dresden |
| 2006/0282328 | A1* | 12/2006 | Gerace et al. .......... 705/14 |
| 2007/0060099 | A1* | 3/2007 | Ramer et al. .......... 455/405 |
| 2008/0133503 | A1 | 6/2008 | Popescul et al. |

OTHER PUBLICATIONS

International Preliminary Report on Patentability for International Application No. PCT/US2008/056159, dated Oct. 15, 2009 (7 pages).

Zhao et al., "Detecting Region Outliers in Meteorological Data", Department of Computer Science, Virginia Polytechnic Institute and State University, *GIS'03*, pp. 49-55, Nov. 7-8, 2003.

Bay et al., "Mining Distance-Based Outliers in Near Linear Time with Randomization and a Simple Pruning Rule", Institute for the Study of Learning and Expertise, NASA Ames Research Center Computational Sciences Division, *SIGKDD '03*, Aug. 24-27, 2003.

Lane et al., "Temporal Sequence Learning and Data Reduction for Anomaly Detection", Purdue University, *ACM Transactions on Information and System Security*, vol. 2, No. 3., pp. 295-331, Aug. 1999.

Pless et al., "Evaluation of Local Models of Dynamic Backgrounds", Department of Computer Science and Engineering, Washington University, downloaded from http://www.cs.wustl.edu/~pless/papers/plessDynamicBackgrounds.pdf on Feb. 20 2007.

Bay et al., "A Framework for Discovering Anomalous Regimes in Multivariate Time-Series Data with Local Models", Center for the Study of Language and Information, Stanford University, NTT Communication Science Laboratories, downloaded from http://www.isle.org/~sbay/papers/darts.pdf on Feb. 20, 2007.

* cited by examiner

DYNAMIC BID PRICING FOR SPONSORED SEARCH

BACKGROUND

The present invention relates generally to online searching and advertising methods and apparatus. More particularly, the present invention relates to dynamic bid pricing for sponsored search.

Sponsored search systems allow advertisers and information providers an added degree of control over the presentation of their advertisements or online information to users of online systems. U.S. Pat. No. 6,269,361, entitled "System and Method For Influencing A Position On A Search List Generated By A Computer Network Search Engine," issued Jul. 21, 2001 and commonly assigned with the present application, discloses one such sponsored search system. Such a system provides a method for managing search listings of information providers or advertisers in a pay for placement search database. A pay for placement search system allows information providers to bid on keywords or search terms. The pay for placement search system or sponsored search marketplace is offered by an online service provider who maintains the necessary databases and servers to provide online access to users and advertisers or information providers. Information providers' search listings generally include a search term and other text or a banner advertisement which is searched for a match with a submitted search query. A user uses a browser program to submit a search query to a search engine which searches the database, including the search terms of the information providers' search listings. An example of such a system may be found on the World Wide Web at searchmarketing.yahoo.com. U.S. Pat. No. 6,269,361 is incorporated in its entirety herein by this reference.

In such a system, when a user through a search engine searches the database for a particular keyword or search term on which the information provider has bid, the information provider's search listing is displayed to the user with other search results. Conventionally, search listings with higher bid amounts are displayed more prominently among the search results, usually at the top of the list where they are seen first by the user. If the user clicks through a search listing, the user's browser is re-directed to the information provider's site and the information provider is charged an amount equal to the bid amount he has bid on the search listing.

Thus, pricing of information in such a system corresponds to the bid amounts set by the information providers. The bid amounts are managed by information providers in an active bidding process. An information provider may raise or lower a bid on a keyword according to a variety of factors, including advertising budget, market conditions and the presence and activity of other information providers in the sponsored search marketplace. Other bid pricing models have been developed for sponsored search systems.

There are other factors that are not currently taken into account in sponsored search pricing models. For example, a marketplace may be more dynamic and may change more rapidly than information providers can react to manage their bids. One example is a sudden surge in popularity or interest in a celebrity or a product. In such a circumstance, the relative pricing in the sponsored search market will not accurately reflect the actual market value of the information related to that celebrity or product. In this case, there is a time lag between actual market interest and market pricing.

Currently, major search engine operators offering sponsored search services for advertisers, such as Yahoo! Inc. and Google Inc., make available to advertisers user query data around keywords and phrases to assist with the bid process. While Yahoo! Inc. offers actual query counts for a selected key word or phrase and close equivalents during a fixed time period, Google Inc. only demonstrates the relative popularity of a selected key word or phrase and close equivalents over a fixed time period using unmarked bar charts and graphs. Advertisers can then make informed decisions about which key words or phases are relatively more popular and therefore which ones may be worth bidding on and, if so, how much to bid. However, the user query information offered is very static, in that it gives only a snap shot of user query information from the recent past.

Accordingly, there is a need in the sponsored search context for an improved system and method for pricing the information provided by advertisers and information providers.

BRIEF SUMMARY

By way of introduction only, in one embodiment, a method for an online sponsored search system includes storing a database of items. At least some of the items include at least one keyword and a money amount associated with a respective advertiser. The method further includes receiving information about current user preferences within the online sponsored search system. When the received user information relates to a keyword associated with an item, the method includes automatically adjusting the money amount of the item based on the received user preference information. In response to a received user query, the method includes retrieving items relating to the received user search query and generating a search result list including the matching items. The method then includes ordering the matching items according to the adjusted money amounts associated with the matching items.

In a second embodiment, a method for an online sponsored search system includes storing a database of items. At least some of the items include at least one keyword and a money amount associated with a respective advertiser. The method further includes receiving information about current user preferences within the online sponsored search system. When the received user information relates to a keyword associated with an item, the method includes automatically adjusting the money amount of the item based on the received user preference information. In response to the designation of a Web page to receive sponsored advertisements, the method includes identifying items relating to the subject matter of one or more portions of the Web page. The method then includes determining which items are to be shown and their placement on the Web page according to the adjusted money amounts associated with the related items.

In a third embodiment, a sponsored search system includes a sponsored search database which stores a plurality of items, at least some of which are associated with an advertiser and include at least one keyword and a money amount. The sponsored search system further includes a user preference and navigation information system which determines information about current user interests in the system. Further, the system includes an information web server which includes a search engine responsive to user search queries to the sponsored search database and a bid amount adjustment engine responsive to the information about current user interests. The information web server returns a set of search listings to a user in response to a user query, the set of search listings being ordered at least in part based on the information about current user interests.

In a fourth embodiment, a computer based user interface for control of advertiser bid amounts in an online sponsored search system includes a data entry point to receive a user indication from an advertiser of a bid adjustment response to an upward or downward shift in user interest activity within the online sponsored search system. The user interface further includes a bid data entry point to receive from the advertiser a bid adjustment increment.

DETAILED DESCRIPTION OF THE DRAWINGS AND THE PRESENTLY PREFERRED EMBODIMENTS

Figure 1:
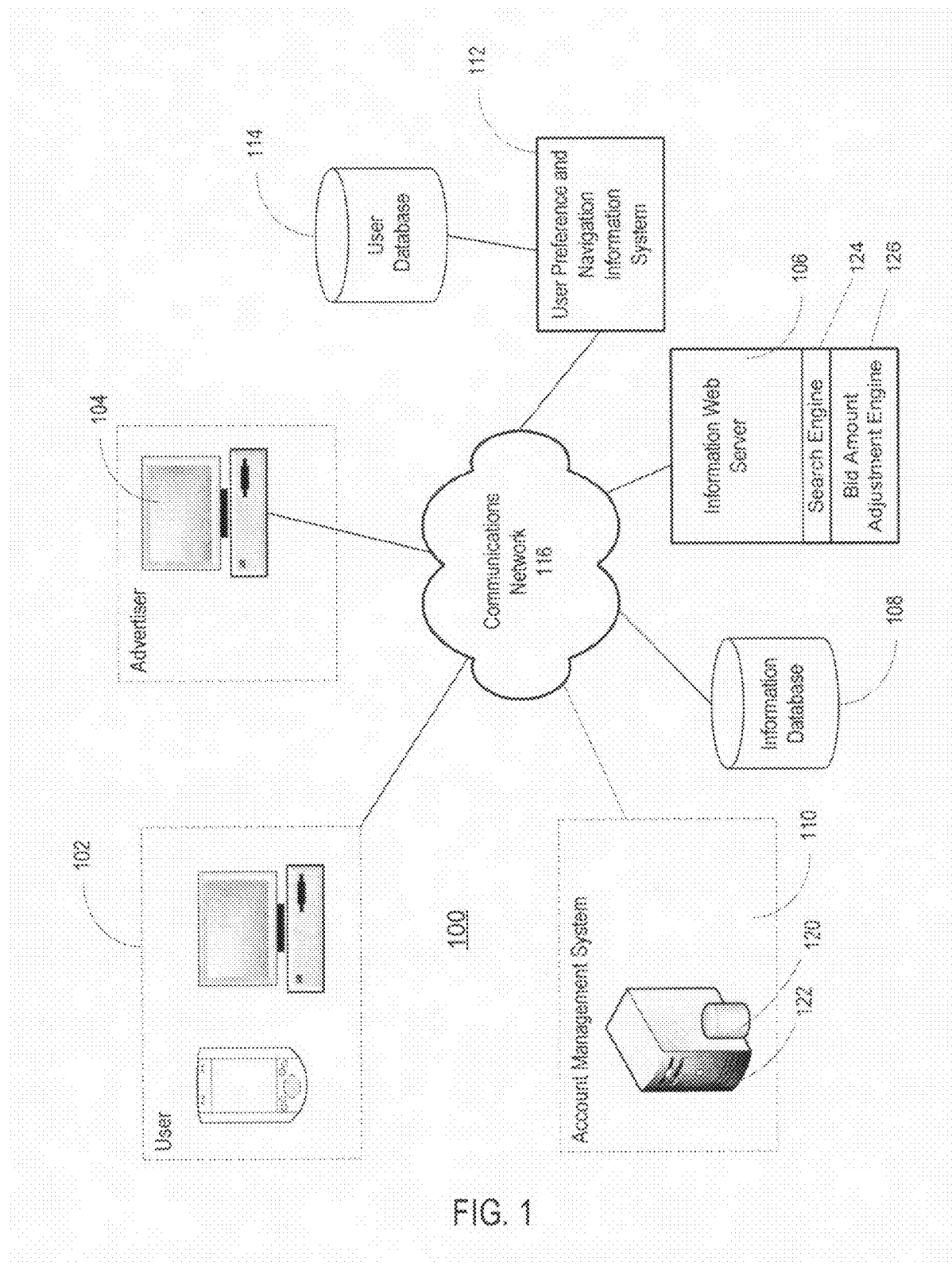
FIG. 1 shows an online information system.

By way of introduction only, in a system and method in accordance with the present disclosure, dynamic pricing reflecting fluctuating marketplace preferences for given content items can be established by correlating the tags and keywords associated with a given sponsored search advertising placement to the fluctuating popularity of associated keywords in search engine queries.

When advertisers use sponsored search systems, such as that offered by Yahoo! Inc. at searchmarketing.yahoo.com/, the advertisers place bids on key words (or key phrases) that are associated with the products or services they wish to promote. The advertiser's objective is to have one or more hyperlinks, leading to the advertiser's web site or to an e-commerce affiliate's Web site, appear in user search query results when users search for the key words or phrases bid upon by the advertiser. The bid amount, and where it falls relative to bid amounts on the same key words or phrases by other advertisers, will determine where (if at all) the advertiser's sponsored links appear on the search results page returned to users entering corresponding search queries. By linking their bid amounts on selected key words or phrases to fluctuations in the user query frequency for such key words or phrases, the advertisers can dynamically and automatically shift their bid strategy to better capture desired placements on user search result pages. The terms "key word" and "key phrase" are used interchangeably herein.

U.S. patent application Ser. No. 11/615,602, entitled "Dynamic Pricing Models for Digital Content," filed Dec. 22, 2006, discloses dynamic pricing models which facilitate effacing distribution of digital content online. This patent application is incorporated herein in its entirety by this reference. Digital content includes online information such as news articles, images, video and audio. In the incorporated application, pricing for digital content is based on relatively current aggregated information about internet user behavior and preferences. By reflecting Internet user preferences—and relatively up-to-date shifts in such preferences—in the pricing for associated content items, content owners can generate greater sales of digital content items at price points that better reflect marketplace user demand.

A system in accordance with the present embodiments provides one or more sources of aggregate internet user preference data. Data generated by search engines concerning user query and navigation patterns can provide extremely probative, useful information regarding the aggregate desires and preferences of the Internet user population for obtaining or accessing certain types of information. Such aggregated information provides an excellent means for closely understanding the marketplace demands of users for different products, services and items of information and entertainment. It follows, therefore, that this aggregated information reflecting ever-shifting user preferences can beneficially be used to set and reset, dynamically, advertiser bids for keywords and phrases associated with their products and services and related to such user preferences.

The pricing models disclosed herein presume that the offerer of information in a sponsored search marketplace has direct access to one or more sources of information capturing relatively current, aggregated information about Internet user preferences and behavior. These sources include search request information received by a search engine and web sites accessed by users through a search engine.

Algorithmic search engines, such as that offered by Yahoo! Inc., register millions of key word search queries each day. Virtually all Internet users regularly rely on search engines in order to locate Web sites, information and commercial items of interest. Search engine operators, therefore, because they capture millions of user queries as soon as such queries are entered, have access to rich stores of data regarding which subject matter is generating more or less interest at a given point in time (user interest). Moreover, this information is captured in near-real-time. In this context, real time or near real time refers to a time span substantially simultaneous with a user's interaction with a search engine. Search requests and related information can be stored as received from the users accessing the search engine and thereafter processed for other applications. A delay of no more than a few milliseconds may elapse between receipt of user web and search interactions and the processing of such interactions for use by other facilities of the online service provider. In some applications, real time or near-real-time operation may be desired. However, in other applications, it may be desirable to allow additional time to elapse for processing user interactions such that all desired types of user interest and user behavior data around a given key word or phrase can be appropriately correlated, weighted and normalized for further use. Accordingly, the disclosed invention covers the use of relatively current user interaction data for other applications such as dynamic bid pricing, whether the processing of such interaction data for such applications is performed in real-time, near real time or after some delay.

Additionally, search engine operators capture near-real-time information regarding those web sites of interest to which users navigate once a listing of relevant search results are returned in response to given queries. This may be termed information about user behavior. After a list of search results matching a user's query is presented to the user, the user may click through one or more of the search results. The click through is received at the facilities of the online service provider and is recorded there. The click through is recorded to debit the account of the advertiser associated with the clicked search listing. In addition, the click through may be recorded in order to track user behavior. The click through provides information about a destination to which the user navigates from the web site of the online service provider.

Still further, a browser may provide information about user interaction with information provided to the user by the online service provider through the browser. For example, the amount of time the user spends viewing a search result list may be tracked and reported to the online line service provider for tracking and processing. Further, mousing activities of the user when viewing the search result list or subsequent pages navigated to by the user may also be reported, tracked and processed.

In this manner, data can be collected by search engine operators about user query, browser interaction and navigation patterns. The collected data can be further processed and aggregated to demonstrate desires and preferences of the Internet user population. As used herein, the term "user preference" shall mean, without limitation, any combination or single instance of concepts addressed to user activity performed through a client device, such as the following: user queries, user browser interactions, user navigation patterns, user interest and user behavior.

Such aggregated information provides an excellent tool for understanding the marketplace demands of users for different products, services and items of information and entertainment. Methods for capturing and organizing such interest levels from users are disclosed and taught in U.S. Pat. No. 7,146,416. A related embodiment is available online in techniques used for creating the Yahoo! Buzz Index offered by Yahoo! Inc. It follows, therefore, that this aggregated information reflecting ever-shifting user preferences can beneficially be used to set and reset, dynamically and automatically, advertiser bids on sponsored key words and phrases. The employment of such relatively current user preference information enables advertisers to better link specific bid amounts for key words and phrases to expected user search activity around these key words and phrases.

For certain advertisers, increased user query volumes around keywords and key phases upon which the advertisers have bid may translate into higher click through volumes on the advertiser's sponsored links returned on search result pages. Depending on the advertiser's type of business, the advertiser's budget, and the overall impact to brand awareness or sales, certain advertisers may wish to improve the placement of their sponsored ads on search result pages in response to spikes in user query volumes around the key words and phrases bid upon by that advertiser. This would mean a willingness to increase the bids on those key words and phrases, in anticipation, perhaps, that the higher volumes of business generated as a result of higher query volume would offset any increase in the advertising spend that would result from higher user clicks on the advertiser's better placed sponsored ad links. Certain other advertisers, however, who have fixed budgets or for whom increased query volumes will not necessarily result in a proportionate increase in brand awareness or sales, may desire to lower the bid amounts on key words and phrases in response to spikes in bid-upon key word or phrase query volumes. This would result in worsening the placement of their sponsored ads on search result pages in response to spikes in bid-upon key word and phrase user query volumes, in turn helping to "normalize" the actual user click rates on the advertiser's sponsored ad links.

One preferred embodiment of the dynamic bid pricing model disclosed herein makes recourse, at minimum, to large, commonly used algorithmic search engines as the primary source of aggregated information reflecting user preferences. It should be appreciated, however, that any repository of relatively current information reflecting user preferences can be used to provide the aggregated information for dynamically setting pricing for content items. For example, such information sources can include databases containing regularly updated survey response data, or those containing regularly updated actual sales figures for commerce items closely related in theme, or otherwise, to offered keyword-identified items.

Referring now to the drawing, FIG. 1 shows an online information system 100. The online information system 100 is particularly adapted to providing information and advertising in response to search queries from an online user. The online information system 100 includes a user client system 102, an advertiser client system 104, an information web server 106, an information database 108, an account management system 10, a user preference and navigation system 112 and a user database 114. Components of the system communicate data and information over one or more communications networks such as communications network 116.

In one embodiment, the online information system 100 is a sponsored search system. A sponsored search system allows advertisers to bid on keywords or search terms in an online marketplace. The sponsored search marketplace is offered by an online service provider who maintains the necessary databases and servers to provide online access to users and advertisers or information providers. Information providers' search listings generally include a search term and other text or a banner advertisement which is searched for a match with a submitted search query. A user uses a browser program to submit a search query to a search engine which searches the database, including the search terms of the information providers' search listings. The advertisers control bid amounts which in turn is used in ordering the search listings which match the search query and are sent to the user. In general, a higher bid amount results in a search listing being placed nearer the top of the search results, a spot which is more desirable because it is more likely to be seen by the user. If the user clicks on an advertiser's search listing or performs other actions, a money amount equal to the bid is transferred from the advertiser to the online service provider. Other variations of sponsored search system are possible and the features described herein may be readily extended to other systems.

One example of a sponsored system is the system operated by Yahoo! Inc., on the World Wide Web at yahoo.com. Other examples include information providers affiliated with such an online system, such as advertisers or other information providers that provide to users information originating at a system such as the system operated by Yahoo! Inc. Again, the features described herein may be extended to affiliate systems as well.

The user client system 102 may access the online information system 100 via the communications network 116 to search for information about a topic of interest. For example a user of the user client system 102 may submit a query via the communications network 116 to the information web server 106, which may be implemented on a server or other network enabled system. The query in one embodiment includes a keyword or key phrase.

The user client system 102 connects to the information web server 106 and the information web server 106 via the communications network 116 using a standard browser application. A browser-based implementation allows system features to be accessible regardless of the underlying platform of the user client system 102. For example, the user client system 102 may be a desktop, laptop, handheld computer, cell phone, mobile messaging device, network enabled television, digital video recorder, such as a digital video recorder, automobile, or other network enabled user client system 102, which may use a variety of hardware and/or software packages. In FIG. 1, the user client system is illustrated as including a computer such as a desktop computer or a telecommunications-enabled personal digital assistant (PDA). The user client system 102 may connect to the information web server 106 using a standalone application which may be platform-dependent or platform-independent. Other methods may be used to implement the user client system 102.

The advertiser client system 104 may be used by network information providers such as advertising web site promoters or owners having advertiser web pages. For simplicity, only a single advertiser client system is shown in the illustration of FIG. 1. It is intended that any number of advertiser client systems may access the system 100.

Advertisers may maintain advertiser accounts on the account management system 108 for providing advertisements to users on the system. Advertisements may include banner advertisements, bidded advertisements or any other form of advertisements. These information providers, or advertisers, may wish to access the advertiser account information residing on account management system 110. In one example, an information provider may, through the advertiser account residing on the account management system 110, participate in a competitive bidding process with other advertisers to place information before users based on expressed user interests. An advertiser may bid on any number of search terms relevant to the content of the advertiser's web site. One example of such an online search engine system is disclosed in U.S. Pat. No. 6,269,361 entitled "System and Method for Influencing a Position on a Search Result List Generated by a Computer Network Search Engine" and assigned to Overture Services, Inc. In another example, an advertiser may specify banner advertisements to be placed on web pages sent to users accessing information on the system.

The advertiser client system 104 may also access the online information system 100 via the communications network 116. An advertiser using the advertiser client system 104 submits advertisements, search listings and other content to the information database 108 and information web server 106. Advertisers can manage individual search listings and campaigns of many search listings targeted at aggregate user profiles. Managing search listings includes preparing and editing the text, title and keyword or key phrase of the search listing. Further, managing a search listing includes setting the universal resource locator (URL) to which a user's browser is re-directed upon clicking through the search listing. Still further, managing a search listing includes setting the bid amount for the search listing. The bid amount affects the ordering of the search listing among other search listings presented as search results to the user. Managing search listings may be done manually by advertiser, for example, accessing a web site provided by the operator of the online search system. Alternatively, managing search listings may be done automatically by a machine such as a computer, for example, using extensible markup language (XML) to access the operator's web site including the information web server 106.

It will be appreciated that the components of the online information system 100 may be separate, may be supported on a single server or other network enabled system, or may be supported by any combination of servers or network enabled systems. Various communications devices may be used to provide data communication among the components of the online information system.

The communications network 116 may be any private or public communications network or combination of networks. The communications network 116 may be configured to couple one computing device, such as a server, system, database, or other network enabled device, to another device to enable communication of data between computing devices. The communications network 116 may generally be enabled to employ any form of machine-readable media for communicating information from one computing device to another. The communications network 116 may include one or more of a wireless network, a wired network, a local area network (LAN), a wide area network (WAN), a direct connection such as through a Universal Serial Bus (USB) port, and the like, and may include the set of interconnected networks that make up the Internet. The communications network 116 includes any communication method by which information may travel between computing devices.

The account management system 110 includes computer readable storage medium 120 and a processing system 122. A database is stored on the computer readable storage medium 120 of the account management system 110. The database contains account information for advertisers. The processing system 122 may be accessed by information providers operating an advertiser client system 104.

The information web server 106 includes a search engine 124 and a bid amount adjustment engine 126. The information web server 108 operates in conjunction with the information database 108. The information database 108 forms a sponsored search database, storing search listings of advertisers who access the information web server 106 and the database 108. The search engine 124 is responsive to user search queries to the sponsored search database 108. That is, the search engine 124 receives a search query in the form of a keyword or key phrase. The search engine 124 compares search listings stored in the database 108 against the received query. If one or more search listings have a matching relationship with the search query, the matching search listings are added to a set of search results. By matching relationship, it is meant that a search listing matches the search query in a predetermined way, for example, according to matching rules. For example, the search query might be canonicalized by removing common suffixes, prefixes or other non-meaningful words. If the canonicalized search term matches canonicalized forms of the keywords of the database 108, a match is determined and the search listings associated with the matching keywords are added to the list of search results.

The user preference and navigation information system 112 is configured to determine information about current user interests and behavior within the online sponsored search system. The user database 114 in this embodiment stores information about all transactions and interactions in the system 100. For example, information about all search queries is stored in the user database 114. This corresponds to information about subject matter of current interest to users. Further, information about all click throughs is stored in the user database 114. Further, information about all post-click through actions by a user is stored, as well. Thus, if a user clicks through to an advertiser web site and takes an action such as subscribing to a newsletter, making an online purchase, providing a credit card number or filling out a customer information form, this action may be reported back to the system 100. Information about the action is then stored in the user database 114.

Still further, some browser applications provide information about all activities of the browser. For example, the browser reports the time a web page is kept displayed on a computer. Some browsers report all user activities, such as text typed on the computer keyboard or mousing actions, including mouse-overs in which a mouse is moved to a region of a screen but a click is not entered. The browser may operate under the control of computer readable program code downloaded with a web page from the URL of the system 100 and stored on a computer readable storage medium. In response, the browser monitors and reports some or all activities by the user on the user system 102. All of this information is reported by the browser to the system 100 and stored n the user database.

The raw information may be used to draw conclusions about current user preferences, as will be described in greater detail below in conjunction with FIG. 2. For example, a large number of search queries directed to the same or similar keywords indicates increased user interest in the subject matter related to those keywords. Further, information in the user database 114 may be aggregated or otherwise analyzed to draw additional conclusions. For example, the frequency over a set time period of search queries to the same or similar keywords, or to related subject matter, may indicate spiking user interest. Other types of analysis may be performed as well. In the illustrated embodiment, such analysis is performed by the user preference and navigation information system 1112 operating in conjunction with information stored in the user database 114.

The user preference and navigation information system 112 thus serves as a source of useful information regarding the aggregate desires and preferences of the Internet user population for obtaining or accessing certain types of information. Such aggregated information provides an excellent means for closely understanding the marketplace demands of users for different products, services and items of information and entertainment. This aggregated information reflecting ever-shifting user preferences can therefore be used to set and reset, dynamically, advertiser bids for key words and phrases associated with advertiser products and services and related to such user preferences. The information provided by the user preference and navigation information system 112 therefore makes available automatic bid adjustment in relation to relatively current market demand shifts, as reflected in aggregate shifts in user query patterns. This allows advertisers on the sponsored search system 100 to get a better return on investment through sponsored search systems.

Accordingly, when a search query is received at the information web server 106, the query is provided to the search engine 124 to identify matching search listings of the information database 108. The matching search listings are collected in a set of search results.

Separately, the bid amount adjustment engine 126 obtains from the user preference and navigation information system 112 information about the current user interests within the online sponsored search system as developed by the user preference and navigation information system 112. This information may be used by the bid amount adjustment engine 126 to automatically adjust the bids or money amounts of items in the information database 108. When the search engine 124 then orders the search results into a search results listing, the conventional process of ordering according to bid amount may be maintained. Alternatively, the bid amount adjustment engine 126 may provide the information about the current user interests to the search engine 124. In this case, the search engine 124 modifies the ordering of the search results in the search result list based on the information about the current user interests.

The search result list is then communicated to the user which originated the search query. In this case, the set of search listings is ordered at least in part based on the information about current user interests within the sponsored search system 100. The result is a dynamic pricing model for the system 100. Instead of being fixed or varying only in response to advertiser bid adjustments, the system automatically and dynamically adjusts bid prices in the sponsored search system based on relative popularity or interest levels of users of the system.

In an alternative embodiment, the online information system 100 of FIG. 1 provides advertisements to a web page sent to an online user in response to a request from the user. The online information system 100 detects the subject matter of the web page or of one or more portions of the web page. The web page in one embodiment is pre-designated to receive a sponsored advertisement. The sponsored advertisement is related to the subject matter of the web page. The online information system 100 identifies items such as advertisements relating to the identified subject matter. In this way, the advertising and other content of a web page sent to the user can be tailored to the interests of the user, thereby increasing the usefulness of the web page to the user and increasing the likelihood that the user will click on an advertisement included on the web page.

In one example, the user clicks on a link to a page about physical fitness. The online information system 100 receives the click through, retrieves from the information database 106 or any other source information about the subject matter of the clicked-on page. The online information system 100 then retrieves from the information database 106 or another source information defining advertisements to be associated with the subject matter of a page to be sent to a user. In this case, subject matter listings matching "physical fitness" will be retrieved and one or more matching listings will be used to populate the web page before it is sent to the user with the requested information. For example, advertisements for exercise equipment and personal training services may be included in the web page depending on factors for advertisement selection and positioning.

The selection of the subject matter listings to be included on the web page is based on money amounts bid by advertisers associated with the respective search listings. In general, larger money amounts or bids are rewarded with more prominent positioning, to increase the likelihood that the advertisement will be subsequently clicked by the user viewing the web page.

In accordance with the present embodiments, the selection and positioning of search listings or advertisements on a web page sent to a user is determined at least in part based on current user preference information. In the exemplary embodiment of FIG. 1, such user preference information is determined and stored by user preference and navigation information system 1112. However, any source of user preference information may be used. Further, in an embodiment, both money amounts bid by advertisers and the user preference information may be used to determine inclusion and positioning of advertisements in a web page.

Figure 2:
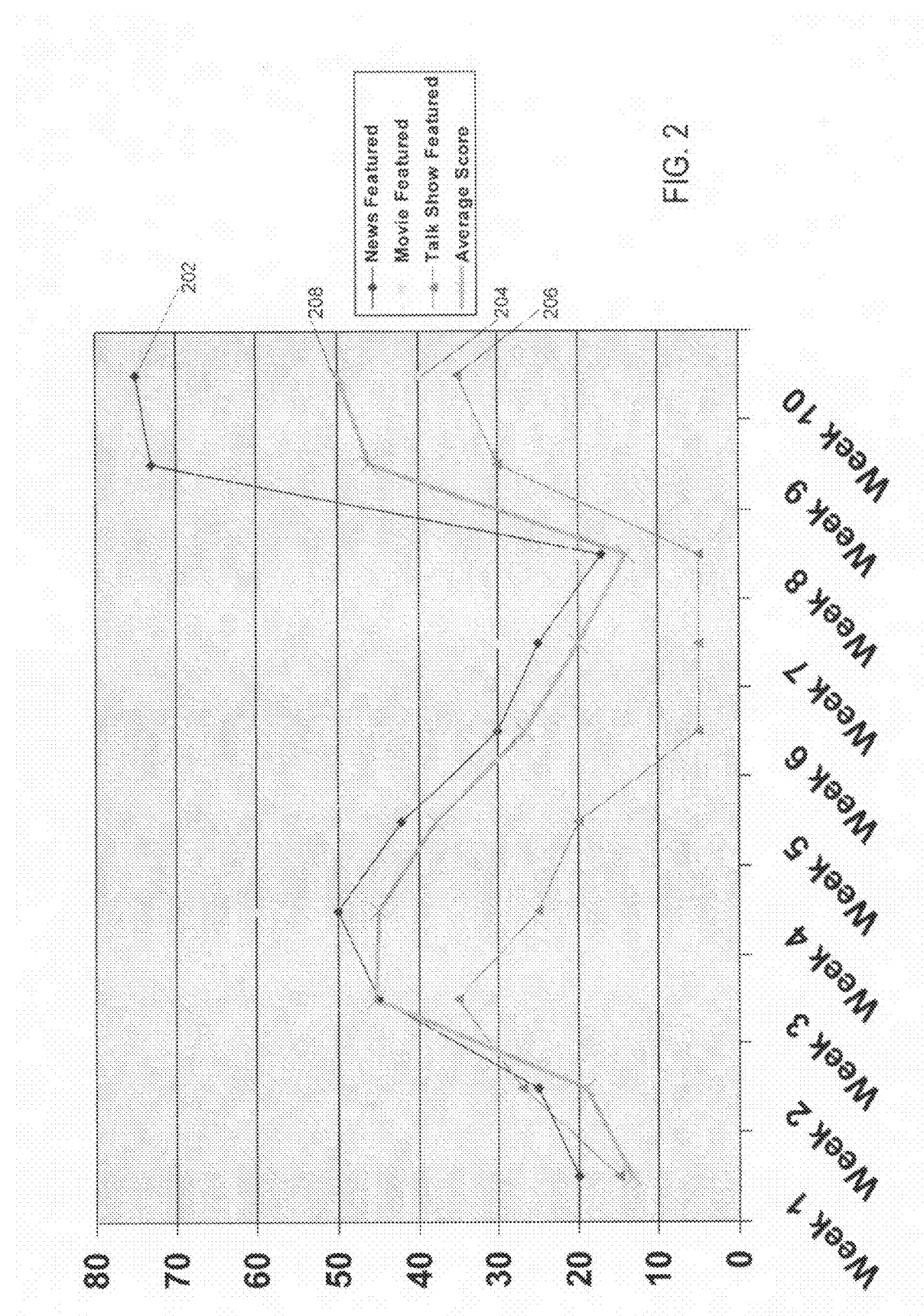
FIG. 2 illustrates relative popularity of a subject over time in the online information system of FIG. 1.

FIG. 2 illustrates relative popularity of a subject over time in the online information system of FIG. 1. More particularly, FIG. 2 shows a scoring model for search popularity for a person referred to as "Celebrity X" over a time period including release of a movie involving Celebrity X and then a news scandal involving Celebrity X. FIG. 2 illustrates interest information from four sources, news featured scores 202, movie featured scores 204, talk show featured scores 206 and average scores 208. The scoring model of FIG. 2 is illustrative only.

The scoring model of FIG. 2 illustrates varying popularity over time for Celebrity X. The simple scenario modeled in FIG. 2 takes a 10 week snapshot of events in Celebrity X's life and the output/consumption of information about Celebrity X as reflected in user search queries (or other captured expressions of user interest) in 3 segments: news, movies, and video. At week 2 of the figure, a new movie involving Celebrity X is released to distribution. Celebrity X begins appearing more frequently on talk shows two weeks prior to the release and then even more so in the week of release and a few weeks thereafter. So too, news features mentioning or focusing on Celebrity X begin to increase right before the movie release and then more so following the movie release. After two weeks in release the movie begins to decline in popularity at the box office. So too, news articles and talk show appearances featuring Celebrity X also decline. Then, at about week 8, a scandal involving Celebrity X is reported in the news causing popular interest in Celebrity X among users of the sponsored search system to again increase. The scandal also serves to boost movies sales somewhat, as well as demands for Celebrity X's appearance on talk shows.

Taking a more detailed example, the overall relative popularity of Celebrity X may be determined by looking just at the combination of queries focusing on, or related to, Celebrity X in all segments of one or more search engines. These cross-segment results can beneficially be used as factors in the disclosed dynamic pricing model. However, as illustrated in FIG. 2, for certain key words for which a more fine tuned assessment of popularity may be desired in order to determine dynamic price points for items related to that key word, it is possible to compare and weight any differences in search query frequency within two or more search segments.

The plot points illustrated in FIG. 2 are meant to illustrate scores, weighted or otherwise, that may be assigned to targeted search queries within news, movie and video search segments within one or more algorithmic search engines. This approach assumes that talk show portions featuring Celebrity X are offered online as viewable video clips which are searchable in the video segment of popular algorithmic search engines. Alternatively, the news featured scores 202 and the movie featured scores 204 may both be drawn from query popularity in the equivalent algorithmic search engine segments, while the talk show featured scores 206 are derived from a specialized database of viewership ratings for various television programs.

Thus, the dynamic pricing model illustrated above in connection with FIG. 1 may be tailored to a particular audience. If search listings related to Celebrity X are offered using dynamic pricing as described herein to a general set of consumers, the online search system might factor in the average level of query popularity for Celebrity X across all search segments. If, however, the target market for search information about Celebrity X is news media producers, then dynamic pricing might factor in only query popularity of Celebrity X in the news search segment. Taking the latter approach, as indicated in FIG. 2, pricing for Celebrity X search listings would be slightly higher, and more so during the period following the onset of Celebrity X's scandal.

Figure 3:
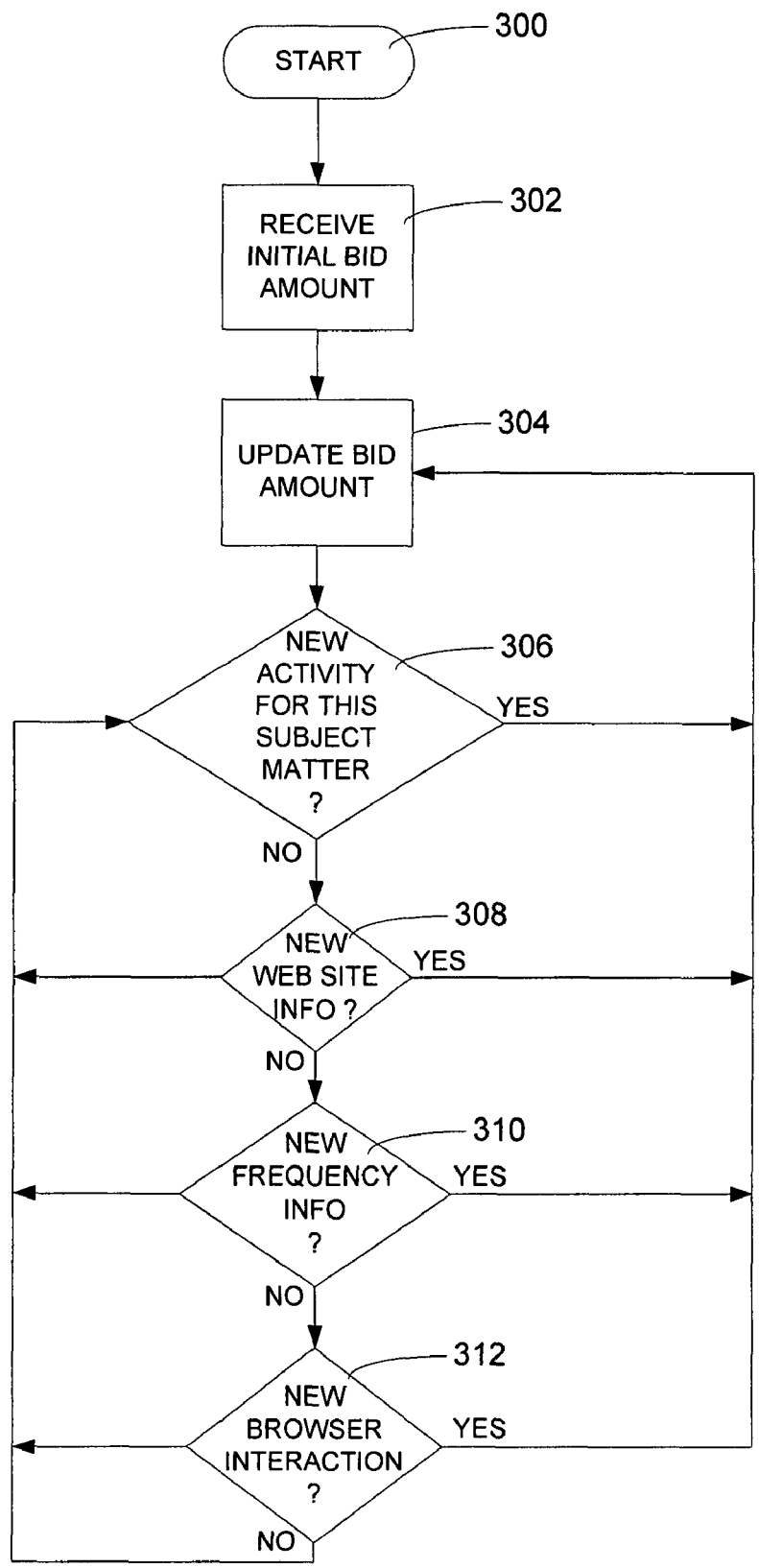
FIG. 3. is a flow diagram illustrating a method for operating the online search system of FIG. 1.

FIG. 3. is a flow diagram illustrating a method for operating the online search system of FIG. 1. More particularly, FIG. 3 illustrates a method in which a repository of online search information such as the user database 114 of FIG. 1 may be used to update bid amounts, for example by the user preference and navigation information system 112 of FIG. 1. The method begins at block 300.

At block 302, an initial bid amount for a search listing is received from an advertiser. This occurs generally, for example, when the advertiser first adds a new search listing to his account on the search system. The advertiser populates a search listing with, for example, a textual title, a textual description, a bid or money amount and a URL to which a searcher's browser is redirected upon a click through. Some systems permit multiple bids on multiple features, such as a bid on a click through, a separate bid on an impression and another separate bid on a post-click through action. The features described herein may be readily extended to such a system.

At block 304, the bid amount for the search listing is updated. One embodiment of this block is described in more detail in conjunction with FIG. 4.

At block 306, a loop including blocks 306, 306, 310 and 312 is entered. At block 306, it is determined if there is new activity for the subject matter associated with the search listing. For example, new activity would include new received search queries or other new information about the subject matter associated with the search listing. Whether the new activity is relevant may be based on the keyword of the search listing and any suitable relevancy rules. If there is new activity, control returns to block 304 to update the bid amount.

If there is no new activity, control proceeds to block 308 to determine if there is new web site information available for the keyword of the search listing. More particularly, it is determined that the repository of search information has received an indication of a searcher who clicked through a search listing associated with the keyword and navigated to one or more other sites, there will be an indication that there is new web site information available. In that case, control returns to block 304 to update the bid amount.

Otherwise, control proceeds to block 310. At block 310, it is determined if new frequency information for the keyword is available. If two or more search queries for a keyword have been received over a given time period, then new frequency information will be available. In that case, control returns to block 304 to update the bid amount.

If not, at block 312 it is determined if new browser interaction information is available. This would occur is the repository stores information about a user's browser interaction in connection with the keyword. If so, control returns to block 304 to update the bid amount. Other wise, control returns to block 306 to continue processing the loop for further update information.

Figure 4:
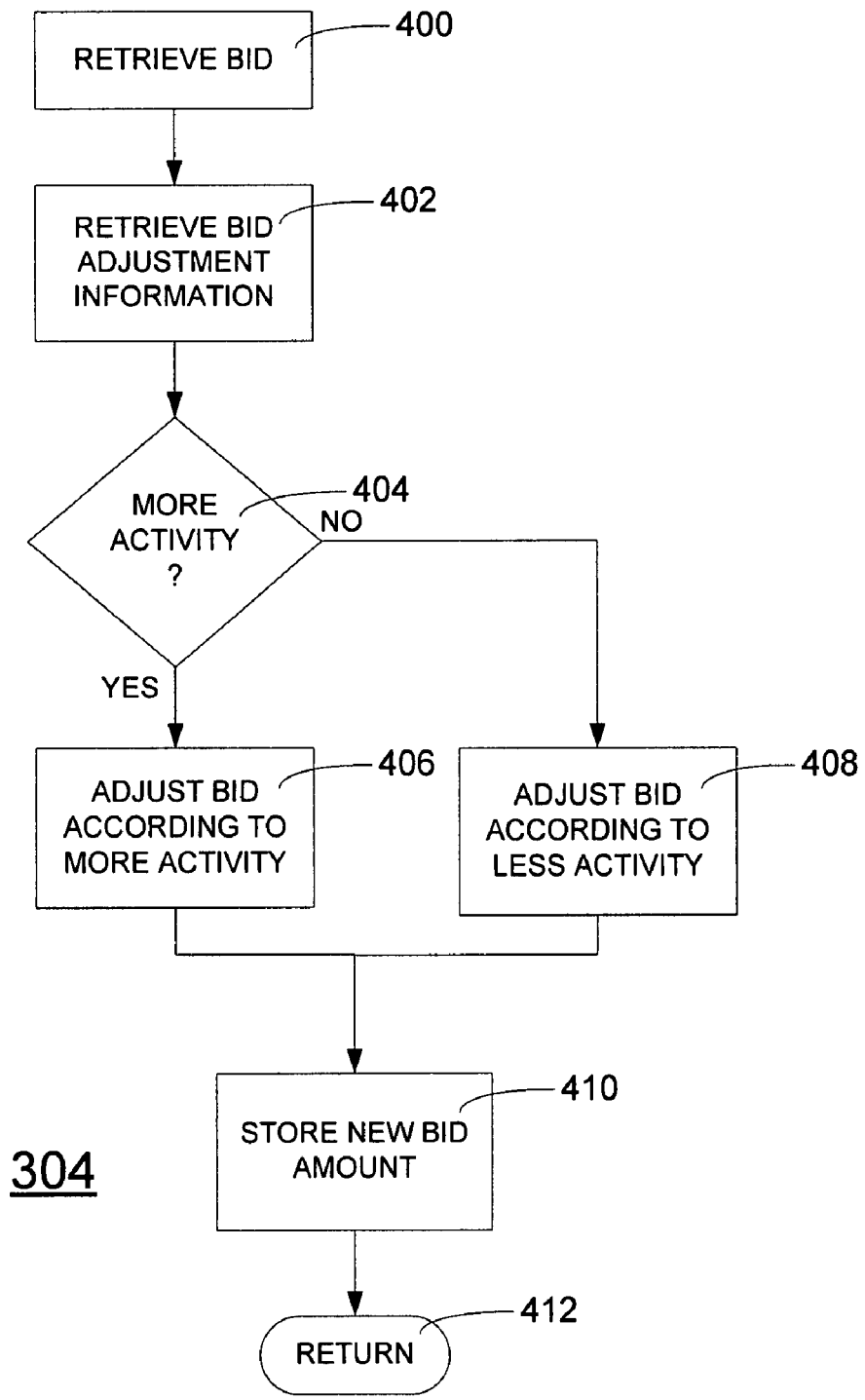
FIG. 4 is a flow diagram illustrating in detail one embodiment of block 304 of FIG. 3.

FIG. 4 is a flow diagram illustrating in detail one embodiment of block 304 of FIG. 3. The method may be implemented as a subroutine which may be called by another routine, such as the method illustrated in FIG. 3. At block 400, the current bid amount is retrieved. For example, in the example of FIG. 1, the user preference and navigation information system 112 performs bid updating and starts by retrieving from the information database 108 the current bid amount for the current search listing.

At block 402, the current bid adjustment information is retrieved. For certain advertisers, increased user query volumes around key words and phases upon which the advertisers have bid may translate into higher click through volumes on the advertiser's sponsored links returned on search result pages. Depending on the type of business the advertiser is in, the advertiser's budget, and the overall impact to brand awareness or sales, certain advertisers may wish to improve the placement of their sponsored ads on search result pages in response to spikes in user query volumes around the keywords and phrases bid upon by that advertiser. This would mean a willingness to increase the bids on those key words and phrases, in anticipation, perhaps, that the higher volumes of business generated as a result of higher query volume would offset any increase in the advertising spend that would result from higher user clicks on the advertiser's better placed sponsored ad links. Certain other advertisers, however, who have fixed budgets or for whom increased query volumes will not necessarily result in a proportionate increase in brand awareness or sales, may desire to lower the bid amounts on key words and phrases in response to spikes in bid-upon keyword or phrase query volumes. This would result in worsening the placement of their sponsored ads on search result pages in response to spikes in bid-upon key word and phrase user query volumes, in turn helping to normalize the actual user click rates on the advertiser's sponsored ad links.

Thus, at block 404, it is determined if the advertiser seeks more activity based on the adjustment to be made. If so, at block 404, the bid for the search listing is adjusted according to the desire for more activity. Otherwise, at block 408, the bid amount is adjusted to produce less activity. At block 410, after the bid amount has been adjusted, the new bid amount is stored for subsequent use in the sponsored search system. At block 412, control returns to the routine which called the method of FIG. 4.

Thus, an upward shift in user preference activity for a given keyword or phase can be factored in to either upward or downward adjustments in and advertiser bid amount, depending on the advertiser's preferences. In the same way, the advertiser may choose to select for either upward or downward bid amount adjustments in response to downward shifts in user query volumes or other user preference indicators. The selected bid adjustment response to either upward or downward user query volumes may be determined algorithmically, such that either upward or downward variation in user interest can be linked appropriately to shifts in bid amount by any suitable money amount increments.

The manner in which the query volumes or other user preference indicator are factored into upward or downward bid adjustment may be driven primarily by the advertiser or a third party placement agent. A user interface may be provided for the advertiser to indicate what basic bid adjustment response (upward or downward) is desired for upward or downward shifts in user preference activity around a bid-upon key word or phrase, and also to indicate the bid adjustment increment desired for each such shift. The interface may also provide for maximum and minimum bid amounts, such that once high or low thresholds are reached bid amounts would not continue to dynamically adjust.

Thus, a computer based interface for control of advertiser bid amounts may include a data entry point to receive a user indication from the advertiser of a bid adjustment response to an upward or downward shift in user interest activity. Further, the user interface may include a bid data entry point to receive from the advertiser a bid adjustment increment. For example, the data entry points may be pop-up menus displayed on a graphical user interface. In another example, the data entry points may be boxes for receiving text information typed into the box by the advertiser. In yet another example, the data entry points may be hyperlinks arranged for actuation by the advertiser. Similarly, maximum and minimum data entry points may be provided for the use of the advertiser. To facilitate advertiser designation of appropriate bid increments for dynamic adjustment, historical data regarding shifts in user interaction activity around the bid upon key word or phrase may also be provided in the interface.

It is therefore intended that the foregoing detailed description be regarded as illustrative rather than limiting, and that it be understood that it is the following claims, including all equivalents, that are intended to define the spirit and scope of this invention.

The invention claimed is:

1. A method for an online sponsored search system, the method comprising:

storing items in a database, at least some items including a keyword and a money amount associated with a respective advertiser of the online sponsored search system;

at a data processing system of the online sponsored search system, receiving information about current user preferences within the online sponsored search system;

in response to a change in the current user preferences, the sponsored search system automatically adjusting money amounts for stored items of advertisers;

detecting bid adjustment definition information of an information provider for that item, the bid adjustment definition information including data defining the advertiser's intention to seek more or less activity in response to a change in current user preferences based on the adjustment to be made by the sponsored search system; and when the received user preference information relates to a keyword of an item, at the data processing system automatically adjusting the money amount of the item based on the advertiser's bid adjustment definition information.

2. The method of claim 1 further comprising:

in response to a received user query, at the data processing system identifying items relating to the received user search query;

generating a search result list including the related items, and ordering the related items according to the adjusted money amounts associated with the related items.

3. The method of claim 1 further comprising:

for web pages pre-designated to receive sponsored advertisements, at the data processing system identifying items relating to the subject matter of one or more portions of the Web page, and determining which items are to be shown and their placement on the Web page according to the adjusted money amounts associated with the related items.

4. The method of claim 1 further comprising:

at the data processing system, aggregating information about relatively current Internet user preferences based on user interactions with the online sponsored search system.

5. The method of claim 4 further comprising:

receiving search queries from users at the data processing system of the online sponsored search system;

identifying subject matter and user interests in the subject matter within the search queries;

updating the information about user preferences based on the identified subject matter and identified user interests; and adjusting the money amount of items in the database based at least in part on the updated user preference information.

6. The method of claim 4 further comprising:

at the data processing system, receiving information about web sites visited by a user of the online sponsored search system;

identifying subject matter and user interests in the subject matter within the web sites visited;

updating the information about current user preferences based on the identified subject matter and identified user interests; and adjusting the money amount of items in the database based at least in part on the updated user preference information.

7. The method of claim 4 further comprising:

at the data processing system, receiving information about browser interaction by a user of the online sponsored search system;

identifying subject matter and user interests in the subject matter within the browser interaction information;

updating the information about current user preferences based on the identified subject matter and identified user interests; and adjusting the money amount of items in the database based at least in part on the updated user preference information.

8. The method of claim 1 wherein the bid adjustment definition information includes data defining an increase or decrease in the money amount in response to an increase in volume of queries for the keyword of the item and to a decrease in the volume of queries for the keyword of the item.

9. The method of claim 8 further comprising:
at the data processing system, providing to the information provider a user interface for collecting bid adjustment definition information.

10. The method of claim 9 further comprising:
at the data processing system, providing a user interface portion for receiving a bid adjustment response to set for a specified shift in the information about current user preferences.

11. The method of claim 10 further comprising:
at the data processing system, providing a second user interface portion for receiving one or more of a maximum bid amount and a minimum bid amount.

12. A computer readable storage medium storing computer readable program code which is operable in conjunction with a data processing system to implement a computer based user interface for control of advertiser bid amounts in an online sponsored search system, the computer readable code implementing the user interface comprising:
computer readable code to implement an automatic adjustment routine by which the data processing system automatically adjusts the bid amount of the advertiser based on a shift in user interest activity occurs;
computer readable code to implement a data entry point to receive a user indication from an advertiser of a bid adjustment response to an upward or downward shift in user interest activity within the online sponsored search system, the bid adjustment response including data defining the advertiser's intention to seek more or less activity in response to the upward shift in user interest activity and in response to the downward shift in user interest activity, and based on the bid adjustment made by the system; and
computer readable code to implement a bid data entry point to receive from the advertiser a bid adjustment increment by which the bid amount is adjusted according to the bid adjustment amount.

13. The computer readable storage medium of claim 12 further comprising:
computer readable code to implement a keyword data entry point for receiving from the advertiser an indication of a keyword which has been bid upon by the advertiser in the online sponsored search system.

14. The computer readable storage medium of claim 12 further comprising:
computer readable code to implement a maximum bid amount entry point for receiving from the advertiser a maximum bid amount; and
computer readable code to implement a minimum bid amount entry point for receiving from the advertiser a minimum bid amount.

\* \* \* \* \*